United States Patent [19]
Liu et al.

[11] Patent Number: 6,119,080
[45] Date of Patent: Sep. 12, 2000

[54] UNIFIED RECURSIVE DECOMPOSITION ARCHITECTURE FOR COSINE MODULATED FILTER BANKS

[75] Inventors: Chi-Min Liu, Hsinchu Hsien; Wen-Chieh Lee, Taoyuan Hsien, both of Taiwan

[73] Assignee: Formosoft International Inc., Taipei, Taiwan

[21] Appl. No.: 09/098,667

[22] Filed: Jun. 17, 1998

[51] Int. Cl.[7] .................................................. G10L 19/02
[52] U.S. Cl. ............................................ 704/203; 704/205
[58] Field of Search .................................... 704/203, 204, 704/205, 500

[56] References Cited

PUBLICATIONS

II Dong Yun, et al. "On the Fixed–Point–Error Analysis of Several Fast DCT Algorithms", IEEE Trans. Circuits and Systems for Video Tech., vol. 3, No. 1, p. 27–41, Feb. 1993.
Yuan–Pei Lin, et al. "Application of DFT Filter Banks and Cosine Modulated Filter Banks in Filtering," Proc. IEEE Asia–Pacific Conf. on Circuits and Systems (APCCAS '94), p. 254–259, Dec. 1994.
Hwang–Cheng Chiang, et al. "Regressive Implementations for the Forward and Inverse MDCT in MPEG Audio Coding," IEEE Signal Processing Letters, vol. 3, No. 4, p. 116–118, Apr. 1996.
C. W. Kok, "Fast Algorithm for Computing Discrete Cosine Transform," IEEE Trans. Signal Processing, vol. 45, No. 3, p. 757–760, Jun. 1997.
Winnie Lau, et al. "A Common Transform Engine for MPEG & AC3 Audio Decoder," IEEE Trans. Consumer Electronics, vol. 43, No. 3, p. 559–566, Jun. 1997.
Chi–Min Liu, et al. "The Design of a Hybrid Filter Bank for the Psychoacoustic Model in ISO/MPEG Phases 1, 2 Audio Encoder," IEEE Trans. Consumer Electronics, vol. 43, No. 3, p. 586–592, Aug. 1997.

Primary Examiner—David R. Hudspeth
Assistant Examiner—Tālivaldis Ivars Šmits

[57] ABSTRACT

A unified architecture for implementing the modified cosine transforms of various cosine modulated filter banks in audio compression standards comprises a permutation module and a transform computing module. A modified cosine transform is computed by a pre-permutation followed by a discrete cosine transform and an inverse modified cosine transform is computed by a discrete cosine transform followed by a post-permutation. The discrete cosine transform computed in the unified architecture is selected from the group of type-II, type-III and type-IV cosine transforms. The computation of an N point discrete cosine transform is decomposed into a permutation-add stage, a sub-transform stage for computing two N/2 point discrete cosine transforms selected from the same group, and a combination stage. The architecture results in good regularity and general applicability as well as reduces complexity.

22 Claims, 7 Drawing Sheets

| CLASSES | MCT TRANSFORM.PAIR | CMFBS IN STANDARDS |
|---|---|---|
| TDAC | $X_k = \sum_{i=0}^{N-1} x_i \cos(\frac{\pi}{2N}(2i+1+\frac{N}{2})(2k+1))$<br>$x_i = \sum_{k=0}^{N/2-1} X_k \cos(\frac{\pi}{2N}(2i+1+\frac{N}{2})(2k+1))$<br>for $k = 0, 1, ..., N/2-1$ and $i = 0, 1, ..., N-1$ | MPEGIV,<br>MPEGII—AAC,<br>MPEG Layer 3 $2^{nd}$ Level<br>AC-3 Long Transform |
| | $X_k = \sum_{i=0}^{N-1} x_i \cos(\frac{\pi}{2N}(2i+1)(2k+1))$<br>$x_i = \sum_{k=0}^{N/2-1} X_k \cos(\frac{\pi}{2N}(2i+1)(2k+1))$<br>for $k = 0, 1, ..., N/2-1$ and $i = 0, 1, ..., N-1$ | AC-3 Short Transform 1 |
| TDAC-Variant | $X_k = \sum_{i=0}^{N-1} x_i \cos(\frac{\pi}{2N}(2i+1+N)(2k+1))$<br>$x_i = \sum_{k=0}^{N/2-1} X_k \cos(\frac{\pi}{2N}(2i+1+N)(2k+1))$<br>for $k = 0, 1, ..., N/2-1$ and $i = 0, 1, ..., N-1$ | AC-3 Short Transform 2 |
| Polyphase Filter Bank | $X_k = \sum_{i=0}^{N-1} x_i \cos(\frac{\pi}{N}(i-\frac{N}{4})(2k+1))$<br>$x_i = \sum_{k=0}^{N/2-1} X_k \cos(\frac{\pi}{2N}(i+\frac{N}{4})(2k+1))$<br>for $k = 0, 1, ..., N/2-1$ and $i = 0, 1, ..., N-1$ | MPEG Layers 1, 2,<br>MPEG Layer 3 $1^{st}$ Level |

FIG.3

| Op. | Proposed DCT II | | Proposed DCT III | | Proposed DCT IV | | [4],[9],[10] DCT II | | [8] DCT III | | [4] DCT IV | |
|---|---|---|---|---|---|---|---|---|---|---|---|---|
| | X | + | X | + | X | + | X | + | X | + | X | + |
| 2 | 1 | 2 | 1 | 2 | 3 | 3 | 1 | 2 | 1 | 2 | 3 | 3 |
| 4 | 4 | 9 | 4 | 9 | 8 | 12 | 4 | 9 | 4 | 9 | 8 | 12 |
| 8 | 12 | 29 | 12 | 29 | 20 | 36 | 12 | 29 | 12 | 29 | 20 | 36 |
| 16 | 32 | 81 | 32 | 81 | 48 | 96 | 32 | 81 | 32 | 81 | 48 | 96 |
| 32 | 80 | 209 | 80 | 209 | 112 | 240 | 80 | 209 | 80 | 209 | 112 | 240 |
| 64 | 192 | 513 | 192 | 513 | 256 | 588 | 192 | 513 | 192 | 513 | 256 | 588 |

FIG. 7

UNIFIED RECURSIVE DECOMPOSITION ARCHITECTURE FOR COSINE MODULATED FILTER BANKS

FIELD OF THE INVENTION

The present invention relates to cosine modulated filter banks (CMFBs) in current audio compression standards, and more specifically to the architecture of implementing CMFBs and the fast computation of various modified cosine transforms (MCTs) used in CMFBs.

BACKGROUND OF THE INVENTION

In current audio coding standards such as MPEG-I Layers 1–3, MPEG-II Layers 1–4, MPEG-IV, and AC-3, cosine modulated filter banks (CMFBs) have been widely adopted to transform an audio sequence from time domain to transform domain or subband domain for compression. However, all the CMFBs' formulae vary with not only the different standards but also the standard layers, block length, and either encoder or decoder. For real-time applications, these various forms need to be individually designed and tuned for precision, complexity, and memory movements.

FIG. 1 illustrate the structure of CMFBs in an audio encoder and decoder. As shown in FIG. 1, the process of CMFBs comprising two steps, i.e., the window-and-overlapping addition (WOA) and the modified cosine transform (MCT). The WOA is to perform a windowing multiplication and addition with overlapping audio blocks.

The complexity of this step is O(k) per audio sample, where k depends on the overlapping factors of the forms. For example, the factor k is 16 for the MPEG-I Layers 2 and is 2 for the AC-3. The second step, MCT, has a complexity O(W) per audio sample, where W is the windowing length and is quite different for various CMFBs. The range of W is from 36 for MPEG-I Layer 3 to 4096 for the MPEG-IV. For WOA, direct implementation has been generally adopted and the design is straightforward. On the contrary, the complexity of the MCT is high, and fast approaches have been developed based on similar concepts developed for the fast Fourier transform.

It has been widely known that developing fast approaches like the fast Fourier transform and the fast cosine transform needs to consider the tradeoff between arithmetic complexity, regularity, modularity, and numerical precision. Hence, it is always a critical issue for designing hardware or software for the fast MCTs.

There have been many fast computing mechanisms developed for the discrete cosine transform (DCT). These mechanisms are developed for different transform length and different DCT types. On the audio coding, the radix 2 DCT is the main considering length. The developing of the radix-2 fast DCT mechanisms can be classified into two approaches including indirect computation of the DCT through the fast Fourier transform or the fast Hartley transform, and direct computation of the DCT through matrix factorization or recursive decomposition.

However, these two approaches have some disadvantages. The first approach needs additional complexity in mapping DCTs into other transforms while the second approach in general lacks the modularity and data regularity.

As mentioned by Yun et al., "On the fixed-point-error analysis of several fast DCT algorithms," IEEE Trans. Circuits Syst. Video Technol., Vol. 3, February 1993, pp. 27–41, the modularity and the regularity are essential for designing hardware and generalizing to higher order transform.

Recently, Kok has developed the fast algorithm for type-II DCT which can recursively decompose one type-II DCT with length N into two type-II DCTs with length (N/2) (see "Fast algorithm for computing discrete cosine transform," IEEE Trans. on Signal Porcess., Vol. 45, No. 3, March 1997, pp. 757–760). The decomposition from one DCT into two DCTs leads to the merit in modularity and regularity.

SUMMARY OF THE INVENTION

This invention has been made to overcome the above mentioned drawbacks and inefficiency in the implementation and computation of various CMFBs in the current audio standards. The primary object of this invention is to provide a unified architecture which leads all MCTs in audio compression standards into two modules comprising a pre-(or post-) permutation and a DCT.

According to this invention, various modified cosine transforms used in a time-domain aliasing cancellation (TDAC) filter bank, a variant of the TDAC (TDAC-variant) filter bank and a polyphase filter bank can be divided as two modules comprising a permutation module and a discrete cosine transform module. The forward transform can be computed by a pre-permutation and a DCT while the inverse transform can be computed by a DCT and a post-permutation. The DCT can be either type-II, type-III or type-IV.

Another object of this invention is to provide a fast computation method that is applicable to the three types of DCT, and a common computing vehicle for the three DCT types. Through the same computing vehicle, the software modules or hardware modules can be developed for all the audio compression standards.

To achieve low complexity, this invention follows a direct computation approach. Recursive decomposition is the vehicle adopted in developing fast methods for sinusoidal transforms such as the discrete Fourier transform and the discrete cosine transform. This invention presents a recursive de composition mechanism for the decomposition of one type of DCT into either type-II, type-III, or type-IV.

Accordingly, it is a further object of this invention to provide a fast algorithm which recursively decomposes a type of DCT with length N into other types of DCTs with length N/2.

It has been demonstrated that the architecture of this invention has good features in regularity, complexity, and general applicability to all MCTs in audio coding standards. The complexity analysis also shows that the present invention has a complexity matching that of the well-known DCT approach.

Other objects and benefits of the invention will become apparent from the detailed description which follows hereinafter when taken in conjunction with drawing figures which accompany it.

BRIEF DESCRIPTION OF THE DRAWINGS

FIG. 3 illustrates the formula of the three classes of the CMFB and the correspondence with various audio-coding standards.

FIG. 7 illustrates the arithmetic complexity of the approach according to the present invention and the existing approaches for the radix-2 DCTs.

DETAILED DESCRIPTION OF THE PREFERRED EMBODIMENTS

Figure 1:
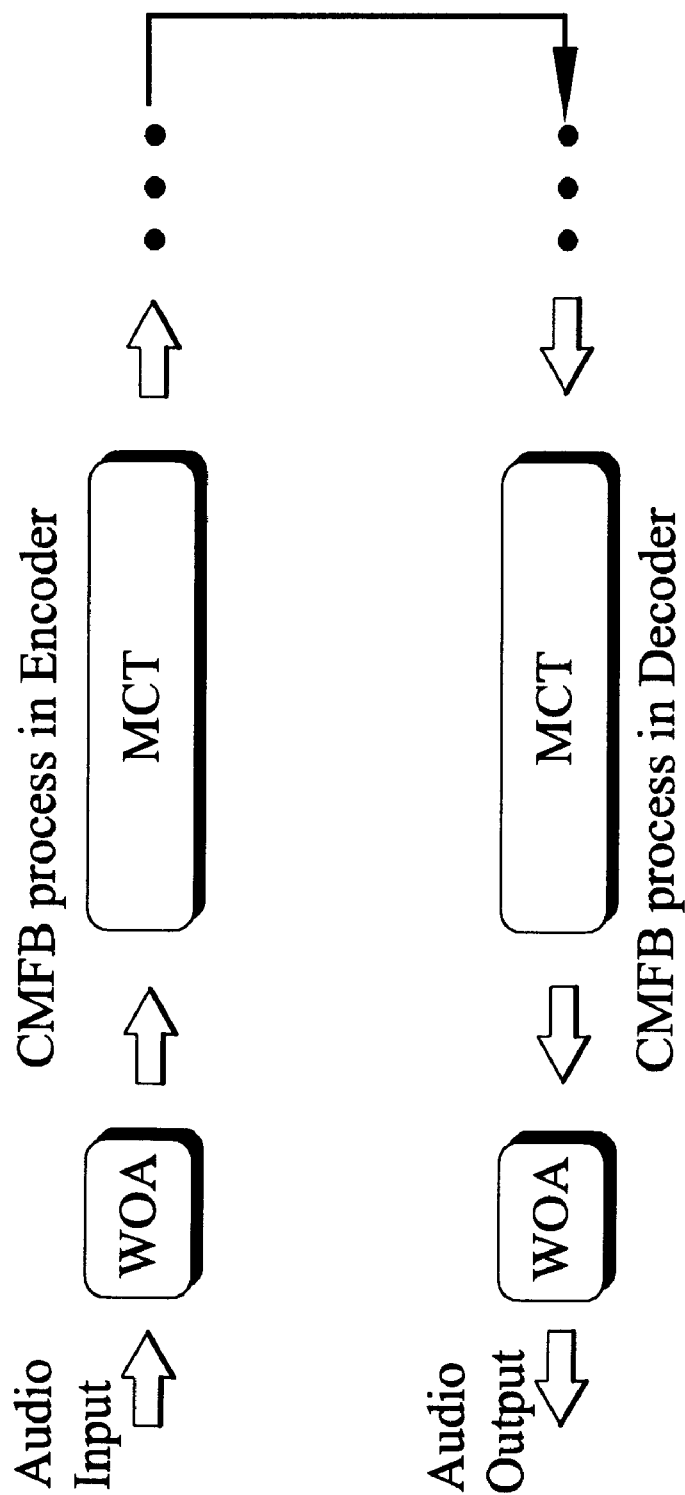
FIG. 1 illustrates the general process of cosine modulated filter banks in an audio encoder and a decoder.
Figure 2:
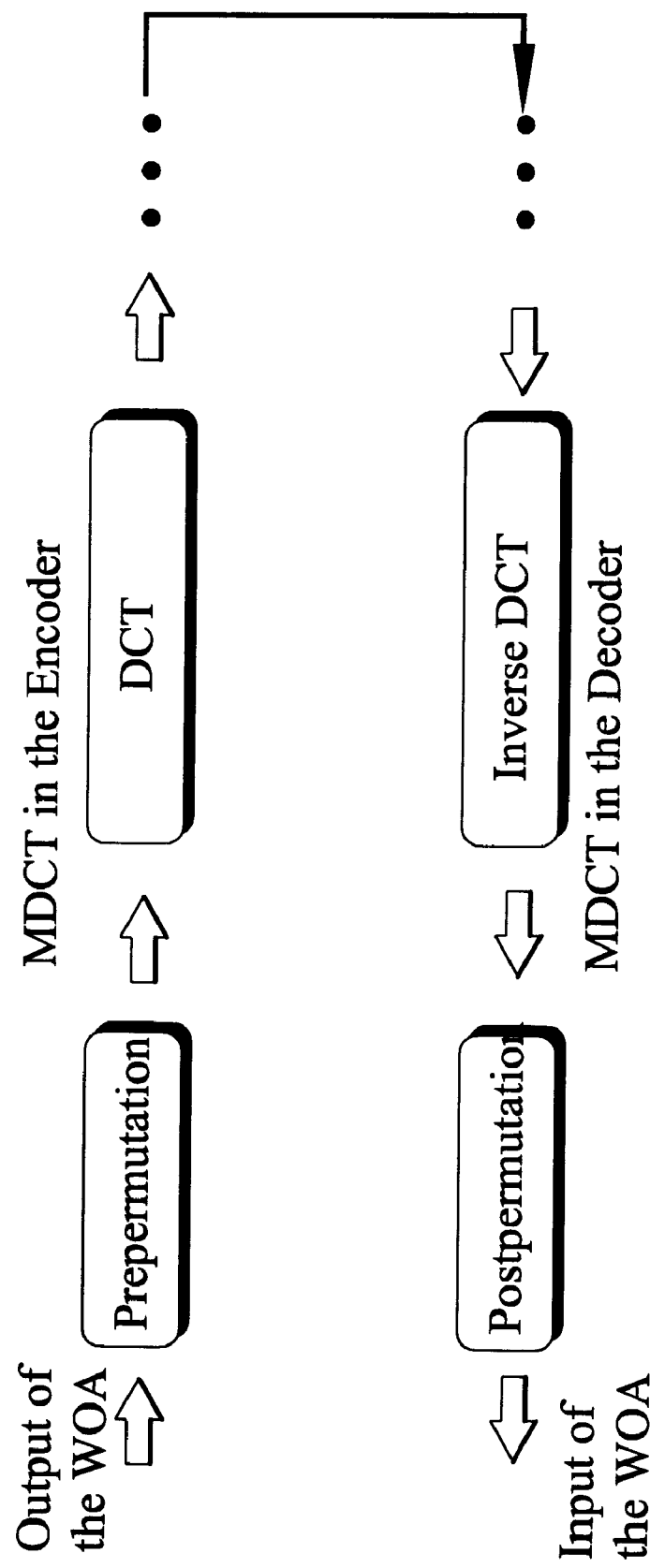
FIG. 2 illustrates the representation of MCTs into permutations and DCTs according to the present invention.

As mentioned before, this invention leads the various MCTs of CMFBs into two modules: a pre-(or post-) permutation module and a DCT module. FIG. 2 illustrates the representation of the MCT into a permutation and the DCT according to this invention. In addition, the DCT derived from the MCTs can be one of the three types of DCTs generally referred to as type-II, type-III, and type-IV.

The permutation requires only straightforward operations but the computation of DCTs of various types greatly impacts the efficiency and performance of an audio encoder or decoder. To achieve low complexity, this invention follows a direct computation approach that involves recursive decomposition of the DCTs.

This invention uses a recursive decomposition method for computing various DCTs. The method of this invention leads to two important features. The first feature is that the approach has a data regularity which is a property of the fast Fourier transform but not a general property for the fast cosine transform. The regularity is important for the data path design in VLSI chip design and the memory addressing in software programming.

The second feature is that the fast method can be optimally implemented for all the MCTs in audio standards. Because the method recursively and regularly decomposes the long length transforms into short length ones through three types of the DCTs, the unrolling of the recursive decomposition from length N into length 2 will be the interleaving of the three types of the DCTs.

In other word, the fast method is applicable to all the three types of the DCT, and the computing vehicle for the three DCT types is the same. Hence, this invention demonstrates that all the various CMFBs in the audio coding standards lead to different pre-permutations or post-permutations but will have the same computing vehicle for the DCTs. Consequently, through the same computing vehicle, the software modules or hardware modules can be generally developed for all these audio compression standards.

Furthermore, this invention develops the decomposition through the interleaving of three types of DCT instead of the same type of DCTs in order to have the regularity and the modularity. Because the decomposition is the interleaving of the three types of the DCTs, the fast method is applicable to all three types of the DCTs instead of just the type II as Kok proposed. The general applicability is the key factor to develop the fast algorithm for the cosine modulated filter banks in the current audio standards.

In the following part of this description, how all the CMFBs lead into permutations and discrete cosine transforms is illustrated, and the decomposition of the three types of the DCTs into other types of DCTs is demonstrated. In addition, the preferred embodiments for the decomposition of type-II DCT and, type-III DCT and type-IV DCT are shown. Moreover, the analysis of arithmetic complexity, regularity, modularity and numerical precision of this invention are provided.

Embodiments

1. The Unified Form for the CMFBs

The MCTs used in current audio standards can be classified into three classes according to the three types of filter banks: time-domain aliasing cancellation (TDAC) filter bank, variant of the TDAC filter bank and the polyphase filter bank. FIG. 3 illustrates the formula of the three classes of the CMFBs and the correspondences to the current audio coding standards.

The following illustrates that all the CMFBs can be represented as a pre- or post-permutation and a discrete cosine transform (DCT) as shown in FIG. 2. And the DCT type can be one of the following three types:

Type-II DCT $$X_k = \sum_{i=0}^{N-1} x_i \cos\left(\frac{\pi}{2N}(2i+1)(k)\right) \text{ for } k = 0, 1, \ldots, N-1. \quad (1)$$

Type-III DCT $$X_k = \sum_{i=0}^{N-1} x_i \cos\left(\frac{\pi}{2N}(i)(2k+1)\right) \text{ for } k = 0, 1, \ldots, N-1. \quad (2)$$

Type-IV DCT $$X_k = \sum_{i=0}^{N-1} x_i \cos\left(\frac{\pi}{4N}(2i+1)(2k+1)\right) \text{ for } k = 0, 1, \ldots, N-1. \quad (3)$$

In the above equations (1)–(3), there have been constant terms in front of each formula. For example, the type-IV DCT is $$X_k = \sqrt{\frac{2}{N}} \sum_{i=0}^{N-1} x_i \cos\left(\frac{\pi}{4N}(2i+1)(2k+1)\right) \text{ for } k = 0, 1, \ldots, N-1.$$

Because the constant term will not affect the derivation result, the constant term $$\sqrt{\frac{2}{N}}$$

is neglected for simplification.

a. The Unified Form for the MCT in TDAC Filter Bank

First, the method to transform the modified cosine transform (MCT) in the TDAC filter bank into a permutation and a type-IV DCT is illustrated.

As shown in FIG. 3, the forward and inverse MCTs of the TDAC filter bank are respectively defined as $$X_k = \sum_{i=0}^{N-1} x_i \cos\left(\frac{\pi}{2N}\left(2i+1+\frac{N}{2}\right)(2k+1)\right) \quad (4)$$

for $k = 0, 1, \ldots, N/2 - 1$,

-continued $$\tilde{x}_i = \sum_{k=0}^{N/2-1} X_k \cos\left(\frac{\pi}{2N}\left(2i+1+\frac{N}{2}\right)(2k+1)\right) \quad (5)$$

for $i = 0, 1, \ldots, N-1$.

The constant term before each summation is again neglected for simplification of the representation. Also note that, unlike the general transform, these $\tilde{x}_i$ are in general not equal to the $x_i$ given the same $X_k$.

The process for transforming the MCT in TDAC filter bank into the permutation and the type-IV DCT comprises the following three steps:

A1) Extending the transform pair in (3) and (4) to a form which has length N along both indices i and k.

A2) Representing the extended transform with length N as a transform with length N, which is quite similar to the type-IV DCT.

A3) Reducing the DCT-like transform with length N to the type-IV DCT with length (N/2).

In accomplishing the unified form, defining the following transform pair:

$$X'_k = \sum_{i=0}^{N-1} x'_i \cos\left(\frac{\pi}{2N}\left(2i+1+\frac{N}{2}\right)(2k+1)\right), \quad (6)$$

for $k = 0, 1, \ldots, N-1$, $$\tilde{x}'_i = \frac{1}{2}\sum_{k=0}^{N-1} X'_k \cos\left(\frac{\pi}{2N}\left(2i+1+\frac{N}{2}\right)(2k+1)\right), \quad (7)$$

for $i = 0, 1, \ldots, N-1$.

The relation between the extended transform and the TDAC transform is as follows:

R1) The sequence of the $X'_k$ in (6) is anti-symmetric in the sense that $X'_k = -X'_{N-1-k}$ if N is a multiple of 4.

For N is a multiple of four, relation R1) is achieved by representing $X'_{N-1-k}$ as $$X'_{N-1-k} = \sum_{i=0}^{N-1} x_i \cos\left(\frac{\pi}{2N}\left(2i+1+\frac{N}{2}\right)(2(N-1-k)+1)\right)$$

for $k = 0, \ldots, N-1$ $$= \sum_{i=0}^{N-1} x_i \cos\left(\frac{\pi}{2N}\left(2i+1+\frac{N}{2}\right)(-1-2k)+\pi\left(2i+1+\frac{N}{2}\right)\right).$$

R2) For N is a multiple of four, assuming that the sequence $X'_k$ with length N is achieved by extending the sequence $X_k$ with length (N/2), then sequence $\tilde{x}_i$ in (5) is equivalent to that of $\tilde{x}'_i$ in (7), given formulas (5) and (7).

Relation R2) is achieved by substituting $X'_k = -X'_{N-1-k}$ for N is a multiple of four and k is from N/2 to N−1.

Through relations R1) and R2), the MCT transforms in (4) and (5) are computed through (6) and (7) respectively.

In order to compute TDAC, the DCT-like transform first is defined as follows.

$$X_k = \sum_{i=0}^{N-1} u_i \cos\left(\frac{\pi}{2N}(2i+1)(2k+1)\right), \text{ for } k = 0, \ldots, N-1, \quad (8)$$

-continued $$\tilde{u}_i = \sum_{i=0}^{N-1} X_k \cos\left(\frac{\pi}{2N}(2i+1)(2k+1)\right), \text{ for } i = 0, 1, \ldots, N-1 \quad (9)$$

Through (8) and (9), some fundamental to compute TDAC transform is set.

That is, $$X'_k = \sum_{j=N/4}^{N-1} x'_i \cos\left(\frac{\pi}{2N}(2j+1)(2k+1)\right) +$$

$$\sum_{m=0}^{N/4-1} -x'_i \cos\left(\frac{\pi}{2N}(2m+1)(2k+1)\right)$$

$$= \sum_{i=0}^{N-1} u_i \cos\left(\frac{\pi}{2N}(2j+1)(2k+1)\right)$$

$$= X_k$$

This is from the following form (10)

$$u_i = -X_{i+\frac{3N}{4}}, \text{ for } i = 0, 1, \ldots, \frac{N}{4}-1, \quad (10)$$

$$u_i = X_{i-\frac{N}{4}}, \text{ for } i = \frac{N}{4}, \frac{N}{4}+1, \ldots, N-1.$$

The sequence $\tilde{x}'_i$ computed from (7) can be obtained from the sequence $\tilde{u}_i$ computed from (9) through the following permutation (11) for N is a multiple of 4.

$$\tilde{x}'_i = \frac{1}{2}\tilde{u}_{i+\frac{N}{4}}, \text{ for } i = 0, 1, \ldots, \frac{3N}{4}-1 \quad (11)$$

$$\tilde{x}'_i = \frac{1}{2}\tilde{u}_{\frac{7N}{4}-1-i}, \text{ for } i = \frac{3N}{4}, \frac{3N}{4}+1, \ldots, N-1$$

Because the $X_k$ computed from (8) is anti-symmetric in the sense that $X_{N-1-k} = X_k$, for $k = 0, 1, 2, \ldots, N-1$, this yields expression (12)

$$X_k = \sum_{i=0}^{N-1} u_i \cos\left(\frac{\pi}{2N}(2i+1)(2k+1)\right) \text{ for } k = 0, 1, \ldots, N-1 \quad (12)$$

$$= \begin{cases} \sum_{i=0}^{N-1} u_i \cos\left(\frac{\pi}{2N}(2i+1)(2k+1)\right) & \text{for } k = 0, 1, \ldots, \frac{N}{2}-1 \\ -X_{N-1-k} & \text{for } k = \frac{N}{2}\ldots N-1 \end{cases}$$

Representing type-IV DCT with length (N/2) according to (3) gives $$Y_k = \sum_{i=0}^{\frac{N}{2}-1} s_i \cos\left(\frac{\pi}{2N}(2i+1)(2k+1)\right) \text{ for } k = 0, 1, \ldots, \frac{N}{2}-1 \quad (13)$$

In order to compute the DCT-like transform in (8) and (9) through type-IV DCT in (13), the following expressions are set to be the basis.

That is, the sequence $X_k$ in (8) for $k = 0, 1, 2, \ldots (N/2)-1$ is equivalent to the sequence $Y_k$ in (13) if $$s_i = u_i - u_{N-1-i} \text{ for } i = 0, 1, \ldots, (N/2)-1 \quad (14)$$

For i=0, 1, 2, ..., (N/2)−1, the sequence $\tilde{u}_i$ in (9) is equivalent to the sequence $Y_i$ of type-IV DCT in (15) with $s_k=2X_k$, where expression (15) is as follows.

$$Y_i = \sum_{k=0}^{\frac{N}{2}-1} s_k \cos\left(\frac{\pi}{2N}(2k+1)(2i+1)\right) \text{ for } i = 0, 1, \ldots, \frac{N}{2}-1 \quad (15)$$

Summarizing the foregoing description, the MCT in (4) is computed through the type-IV DCT in (13) with the input permutation through (10) and (14), and the inverse MCT in (5) is computed through the type-IV DCT in (15) with the output permutation in (11).

b. The Unified Form for the Variant of TDAC Filter Banks

Dolby AC-3 coder has adopted two variants of TDAC filter banks in order to provide perfect reconstruction property between different block size. As shown in FIG. 3, the first transform pair is defined as $$X_k^1 = \sum_{i=0}^{N-1} x_i^1 \cos\left(\frac{\pi}{2\dot{N}}(2i+1)(2k+1)\right) \quad (16)$$

for $k = 0, 1, \ldots, N/2-1$, $$\tilde{x}_i^1 = \sum_{k=0}^{\frac{N}{2}-1} X_k^1 \cos\left(\frac{\pi}{2N}(2i+1)(2k+1)\right) \quad (17)$$

for $i = 0, 1, \ldots, N-1$

The second transform pair is $$X_k^2 = \sum_{i=0}^{N-1} x_i^2 \cos\left(\frac{\pi}{2N}(2i+1+N)(2k+1)\right) \quad (18)$$

for $k = 0, 1, \ldots, N/2-1$ $$\tilde{x}_i^2 = \sum_{k=0}^{\frac{N}{2}-1} X_k^2 \cos\left(\frac{\pi}{2\dot{N}}(2i+1+\dot{N})(2k+1)\right) \quad (19)$$

for $i = 0, 1, \ldots, N-1$

The process for transforming the TDAC-variant in (16) and (17) into the permutation and the type-IV DCT comprises the following steps:

B1) Setting the relation between the transform pair in (16)–(17) and that in (8)–(9).
B2) Setting the fundamental to derive the TDAC-variant in (16) and (17) through DCT-like transforms in (8) and (9) according to the equation of $X_k=-X_{N-k-1}$ for k=N/2, N/2+1, ..., N−1.
B3) The DCT-like transform is computed through the type-IV DCT by setting the basis mentioned in earlier description.

In step B1), the relation is $\tilde{u}_i=2\tilde{x}_i^1$, and in step B2), the anti-symmetric property of $X_k$ and the relation in step B1) are the fundamental.

Hence, the first form of the TDAC-variant transform is transformed into the permutation and the type-IV DCT.

The following expression (20) and (21) illustrate the relation between the MCT of the TDAC-variant in (16)–(17) and that in (18)–(19).

That is, the sequence $X_k^2$ in (18) is equivalent to $X_k^1$ if $$x_i^2 = -x_{i+\frac{N}{2}}^1 \quad (20)$$

for $i = 0, 1, \ldots, \frac{N}{2}-1$, $$x_i^2 = -x_{i-\frac{N}{2}}^1$$

for $i = \frac{N}{2}, \frac{N}{2}+1, \ldots, N-1$

This is because $$X_k^2 = \sum_{j=N/2}^{N-1} \hat{x}_{j-N/2}^2 \cos\left(\frac{\pi}{2\dot{N}}(2j+1)(2k+1)\right) -$$

$$\sum_{m=0}^{N/2-1} \hat{x}_{m+N/2}^2 \cos\left(\frac{\pi}{2\dot{N}}(2m+1)(2k+1)\right)$$

$$= X_k^1.$$

In addition, the sequence $\tilde{x}_i^2$ in (19) is equivalent to $\tilde{x}_i^1$ if $$\tilde{x}_i^2 = -\tilde{x}_{i+\frac{N}{2}}^1 \quad (21)$$

for $i = 0, 1, \ldots, \frac{N}{2}-1$, $$\tilde{x}_i^2 = \tilde{x}_{i-\frac{N}{2}}^1$$

for $i = \frac{N}{2}, \frac{N}{2}+1, \ldots, N-1$

Summarizing the foregoing description, from expression (14), the MCT of the first TDAC-variant in (16) is computed directly through the type-IV DCT in (13) with the input permutation.

$$s_i = x_1^i - x_i^{N-1-i} \text{ for } i=0, 1, \ldots, (N/2)-1 \quad (22)$$

From two equivalence relations, one is sequence $\tilde{u}_i$ in (9) and sequence $Y_i$ of type-IV DCT in (15), the other is sequence $\tilde{u}_i$ in (9) and two times the sequence computed from (9), the inverse MCT of the first TDAC-variant in (17) is computed directly through the type-IV DCT in (15).

From (14) and (20), the MCT of the second TDAC-variant in (18) is computed directly through the type-IV DCT in (13) with the input permutation in (20) and (22).

From two equivalence relations, one is sequence $\tilde{u}_i$ in (9) and sequence $Y_i$ of type-IV DCT in (15) and expression (21), the inverse MCT of the second TDAC-variant in (19) can be computed directly through the type-IV DCT in (15) through the output permutation in (21).

c. The Unified Form for the Polyphase Filter Banks

As shown in FIG. 3, the transform pair for the cosine modified transform in polyphase filter bank is defined as $$X_k = \sum_{i=0}^{N-1} x_i \cos\left(\frac{\pi}{N}\left(i-\frac{N}{4}\right)(2k+1)\right) \quad (23)$$

for $k = 0, 1, \ldots, N/2-1$

-continued $$\tilde{x}_i = \sum_{k=0}^{N/2-1} X_k \cos\left(\frac{\pi}{N}\left(i + \frac{N}{4}\right)(2k+1)\right) \quad (24)$$

for $i = 0, 1, \ldots, N-1$

To compute the MCT in (23) and the inverse MCT in (24), the invention provides the following two transform formulas:

$$X'_k = \sum_{i=0}^{N-1} u_i \cos\left(\frac{\pi}{N}(i)(2k+1)\right) \text{ for } k = 0, 1, \ldots, N/2-1 \quad (25)$$

$$\tilde{u}_i = \sum_{k=0}^{N/2-1} X'_k \cos\left(\frac{\pi}{N}(i)(2k+1)\right) \text{ for } i = 0, 1, \ldots, N-1 \quad (26)$$

After having given (23) and (25), the sequence $X'_k$ computed through (25) is equivalent to the sequence $X_k$ computed through (23) if $$u_i = x_{i+\frac{N}{4}} \quad (27)$$

for $i = 0, 1, \ldots, \frac{3N}{4} - 1;$ $$u_i = -x_{i-\frac{3N}{4}}$$

for $i = \frac{3N}{4}, \frac{3N}{4} + 1, \ldots, N-1$

Similarly, after having given (24) and (26) and $X_k = X'_k$, the sequence $\tilde{x}_i$ computed through (24) can be permuted from the sequence $\tilde{u}_i$ computed through (26) with the following form $$\tilde{x}_i = \tilde{u}_{i+N/4} \text{ for } i = 0 \ldots 3N/4 - 1 \text{ and } +\tilde{i}\,\tilde{x} + \tilde{1}\,_i = -\tilde{u}_{i-3N/4} \text{ for } i = 3N/4, 3N/4+1 \ldots N-1 \quad (28)$$

Acording to (1), the type-II DCT with length (N/2) is $$X_i = \sum_{k=0}^{\frac{N}{2}-1} x_k \cos\left(\frac{\pi}{N}(2k+1)(i)\right) \text{ for } i = 0, 1, \ldots, \frac{N}{2}-1 \quad (29)$$

Let $X'_k = x_k$, expression (29) gives the sequence $\tilde{u}_i$ in (26) from $X_i$ through $$\begin{cases} \tilde{u}_i = 0 & \text{for } i = N/2 \\ \tilde{u}_i = X_i & \text{for } i = 0, 1, \ldots, N/2-1 \\ \tilde{u}_i = -X_{N-i} & \text{for } i = \frac{N}{2}+1, \frac{N}{2}+2 \ldots, N-1 \end{cases} \quad (30)$$

According to (2), the type-III DCT with length (N/2) is $$X_k = \sum_{i=0}^{\frac{N}{2}-1} x_i \cos\left(\frac{\pi}{N}(i)(2k+1)\right) \text{ for } k = 0, 1, \ldots, \frac{N}{2}-1 \quad (31)$$

In addition, the sequence $X_k$ in (31) is equivalent to the sequence $X'_k$ in (25) if the sequence $x_i$ is computed from the sequence $u_i$ through $$\begin{cases} \dot{x}_0 = u_0 \\ x_i = u_i - u_{N-1-i} & \text{for } i = 1, \ldots, \frac{N}{2}-1 \end{cases} \quad (32)$$

Summarizing the above analysis, the MCT in (23) is computed through the type-III DCT in (31) with the input permutation through (27) and (32). And, the inverse MCT in (24) is computed through the type-II DCT in (29) with the output permutation in (28) and (30).

From the preceding detailed description, the invention illustrates that all the various modified cosine modulated transforms used in TDAC, TDAC-variant, and polyphase filter banks can be divided into two modules: permutation and the DCT. Especially, the forward transform can be represented as a pre-permutation and a DCT while the inverse transform as a DCT and a post-permutation. The DCT can be type-II, type-III, or type-IV.

2. Decomposition for the Discrete Cosine transform

The following provides a method to decompose a type of DCT with length N into two of the three types of the DCT with length N/2.

a. Decomposition for the Type-II DCT

From (1), the kth coefficient of the type-II DCT for an input sequence $x_i$ with length N is $$X_k = \sum_{i=0}^{N-1} x_i \cos\left(\frac{\pi}{2N}(2i+1)(k)\right) \text{ for } k = 0 \ldots N-1.$$

First, decomposing $X_k$ of the type-II DCT into even-indexed and odd-indexed form. The even-indexed output sequence is $$X_{2k} = \sum_{i=0}^{N-1} x_i \cos\left(\frac{\pi}{2N}(2i+1)(2k)\right), \text{ for } k = 0, \ldots, N/2-1. \quad (33)$$

Next, one type-II DCT and one type-IV DCT with length (N/2) are achieved by applying the symmetry and anti-symmetry properties of cosine function on the even-indexed output sequence and odd-indexed output sequence respectively.

Applying the symmetry property as $$\cos\left(\frac{\pi}{N}(2(N-1-i)+1)(k)\right) = \cos\left(\frac{\pi}{N}(2i+1)(k)\right) \quad (34)$$

gives $$X_{2k} = \sum_{i=0}^{N/2-1} (x_i + x_{N-1-i}) \cos\left(\frac{\pi}{N}(2i+1)(k)\right),$$

which is a type-II DCT with input permutation.

The odd-indexed output sequence is $$X_{2k+1} = \sum_{i=0}^{N-1} x_i \cos\left(\frac{\pi}{2N}(2i+1)(2k+1)\right), \text{ for } i = 0, \ldots, N/2-1.$$

Applying the anti-symmetry property as $$\cos\left(\frac{\pi}{2N}(2i+1)(2k+1)\right) = -\cos\left(\frac{\pi}{2N}(2(N-1-i)+1)(2k+1)\right) \quad (35)$$

gives $$X_{2k+1} = \sum_{i=0}^{N/2-1} (x_i - x_{N-1-i}) \cos\left(\frac{\pi}{2N}(2i+1)(2k+1)\right),$$

which s a type-IV DCT with input permutation.

Figure 4:
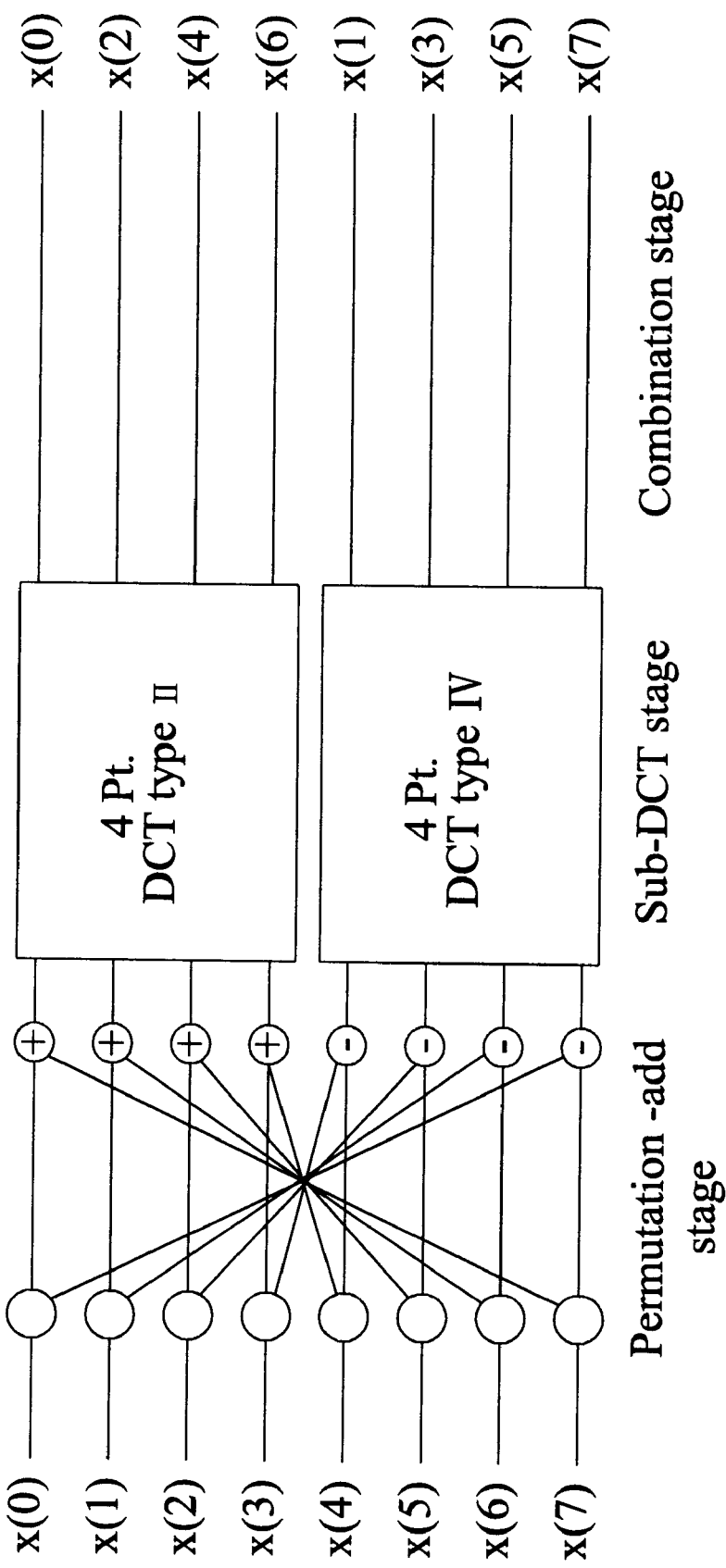
FIG. 4 illustrates the decomposition of one 8-point type-II DCT into one 4-point type-II DCT and one 4-point type-IV DCT according to the present invention.

As we can see, from (34) and (35), a type-II DCT with length N is decomposed into one type-II DCT and one type-IV with length (N/2). FIG. 4 illustrates an embodiment of the decomposition of one 8-point type-II DCT into one 4-point type-II DCT and one 4-point type-IV DCT according to the present invention.

b. Decomposition for the Type-III DCT

From (2), the kth coefficient of the type-III DCT for an input sequence $x_i$ with length N is $$X_k = \sum_{i=0}^{N-1} x_i \cos\left(\frac{\pi}{2N}(i)(2k+1)\right) \text{ for } k = 0, 1, \ldots N-1. \quad (36)$$

First, both the input sequence $x_i$ and the output sequence of the type-III DCT are separated. The input is separated into even-indexed and odd-indexed form while the output is separated into the first half of the sequence and the second half of the sequence; that is, $$X_k = \sum_{i=0}^{N/2-1} x_{2i} \cos\left(\frac{\pi}{N}(i)(2k+1)\right) + \sum_{i=0}^{N/2-1} x_{2i+1} \cos\left(\frac{\pi}{2N}(2i+1)(2k+1)\right) \quad (37)$$

for $k = 0, 1 \ldots, N/2 - 1$ $$X_{\frac{N}{2}+k} = \sum_{i=0}^{N/2-1} x_{2i} \cos\left(\frac{\pi}{N}(i)\left(2\left(k+\frac{N}{2}\right)+1\right)\right) + \sum_{i=0}^{N/2-1} x_{2i+1} \cos\left(\frac{\pi}{2N}(2i+1)\left(2\left(k+\frac{N}{2}\right)+1\right)\right), \quad (38)$$

for $k = 0, 1, \ldots, N/2 - 1$

Next, substituting $\cos\left(\frac{\pi}{N}(i)\left(2\left(k+\frac{N}{2}\right)+1\right)\right) =$ $$\cos\left(\frac{\pi}{N}(i)\left(2\left(\frac{N}{2}-1-k\right)+1\right)\right) \text{ and}$$

$$\cos\left(\frac{\pi}{N}(2i+1)\left(2\left(k+\frac{N}{2}\right)+1\right)\right) =$$

$$-\cos\left(\frac{\pi}{N}(2i+1)\left(2\left(\frac{N}{2}-1-k\right)+1\right)\right) \text{ into (38) yields}$$

$$X_{\frac{N}{2}+k} = \sum_{i=0}^{N/2-1} x_{2i} \cos\left(\frac{\pi}{N}(i)\left(2\left(\frac{N}{2}-1-k\right)+1\right)\right) - \quad (39)$$

$$\sum_{i=0}^{N/2-1} x_{2i+1} \cos\left(\frac{\pi}{2N}(2i+1)\left(2\left(\frac{N}{2}-1-k\right)+1\right)\right)$$

for $k = 0 \ldots N/2 - 1$

Figure 5:
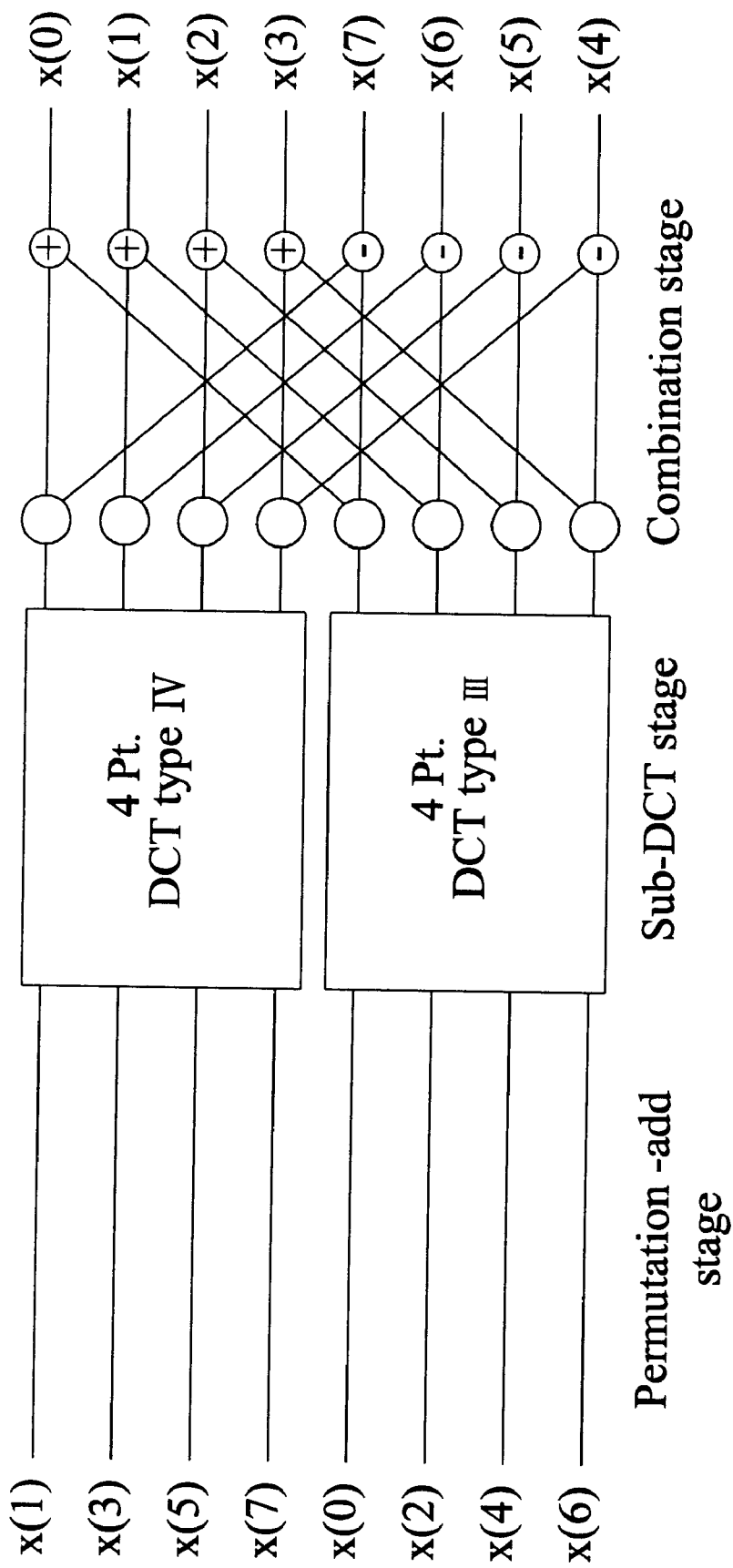
FIG. 5 illustrates the decomposition of one 8-point type-III DCT into one 4-point type-III DCT and one 4-point type-IV DCT according to the present invention.

On the results of (37) and (39), a type-III DCT with length N is decomposed into one type-III DCT and one type-IV DCT with length (N/2). FIG. 5 illustrates an embodiment of the decomposition of one 8-point type-III DCT into one 4-point type-III DCT and one 4-point type-IV DCT according to the present invention.

c. Decomposition for the Type-IV DCT

Before proceeding with the decomposition for the Type-IV DCT, this invention first provides the following property, i.e. an (N+1)xN type-III DCT can be simplified into an N×N type-III DCT $$\sum_{i=0}^{N} x_i \cos\left(\frac{\pi}{2N}(i)(2k+1)\right) = \sum_{i=0}^{N-1} x_i \cos\left(\frac{\pi}{2N}(i)(2k+1)\right)$$

From (3), the kth coefficient of the type-IV DCT for an input sequence $x_i$ with length N is $$X_k = \sum_{i=0}^{N-1} x_i \cos\left(\frac{\pi}{4N}(2i+1)(2k+1)\right) \text{ for } k = 0 \ldots N-1 \quad (40)$$

$$\text{Since } \cos A = \frac{1}{2\cos B}(\cos(A+B) + \cos(A-B)), \quad (41)$$

(40) can be represented as $$X_k = \frac{1}{2\cos\left(\frac{\pi}{4N}(2k+1)\right)}$$

$$\sum_{i=0}^{N-1} x_i \left(\cos\left(\frac{\pi}{2N}(2k+1)(i)\right) + \cos\left(\frac{\pi}{2N}(2k+1)(i+1)\right)\right)$$

Next, separating input into even and odd terms yields $$X_k = \frac{1}{2\cos\left(\frac{\pi}{4N}(2k+1)\right)} \quad (42)$$

$$\left\{\sum_{i=0}^{N/2-1} x_{2i} \cos\left(\frac{\pi}{N}(2k+1)(2i)\right) + \sum_{i=0}^{N/2-1} x_{2i+1} \cos\left(\frac{\pi}{N}(2k+1)(2i+1)\right) + \right.$$

$$\sum_{i=0}^{N/2-1} x_{2i} \cos\left(\frac{\pi}{2N}(2k+1)(2i+1)\right) +$$

$$\left.\sum_{i=0}^{N/2-1} x_{2i+1} \cos\left(\frac{\pi}{2N}(2k+1)(2i+2)\right)\right\}$$

Set $x_{-1} = X_N = 0$, the four terms in (42) can be represented as $$X_k = \frac{1}{2\cos\left(\frac{\pi}{4N}(2k+1)\right)} \left\{\sum_{i=0}^{N/2} (x_{2i} + x_{2i-1}) \cos\left(\frac{\pi}{N}(2k+1)(i)\right) + \right.$$

$$\left.\sum_{i=0}^{N/2-1} (x_{2i} + x_{2i+1}) \cos\left(\frac{\pi}{2N}(2k+1)(2i+1)\right)\right\}$$

Finally, applying the property of $\sum_{i=0}^{N} x_i \cos\left(\frac{\pi}{2N}(i)(2k+1)\right) =$ $$\sum_{i=0}^{N/2-1} x_i \cos\left(\frac{\pi}{2N}(i)(2k+1)\right) \text{ gives}$$

-continued $$X_k = \frac{1}{2\cos\left(\frac{\pi}{4N}(2k+1)\right)} \left\{ \sum_{i=0}^{N/2} (x_{2i} + x_{2i-1})\cos\left(\frac{\pi}{N}(2k+1)(i)\right) + \sum_{i=0}^{N/2-1} (x_{2i} + x_{2i+1})\cos\left(\frac{\pi}{2N}(2k+1)(2i+1)\right) \right\}$$ (43)

Figure 6:
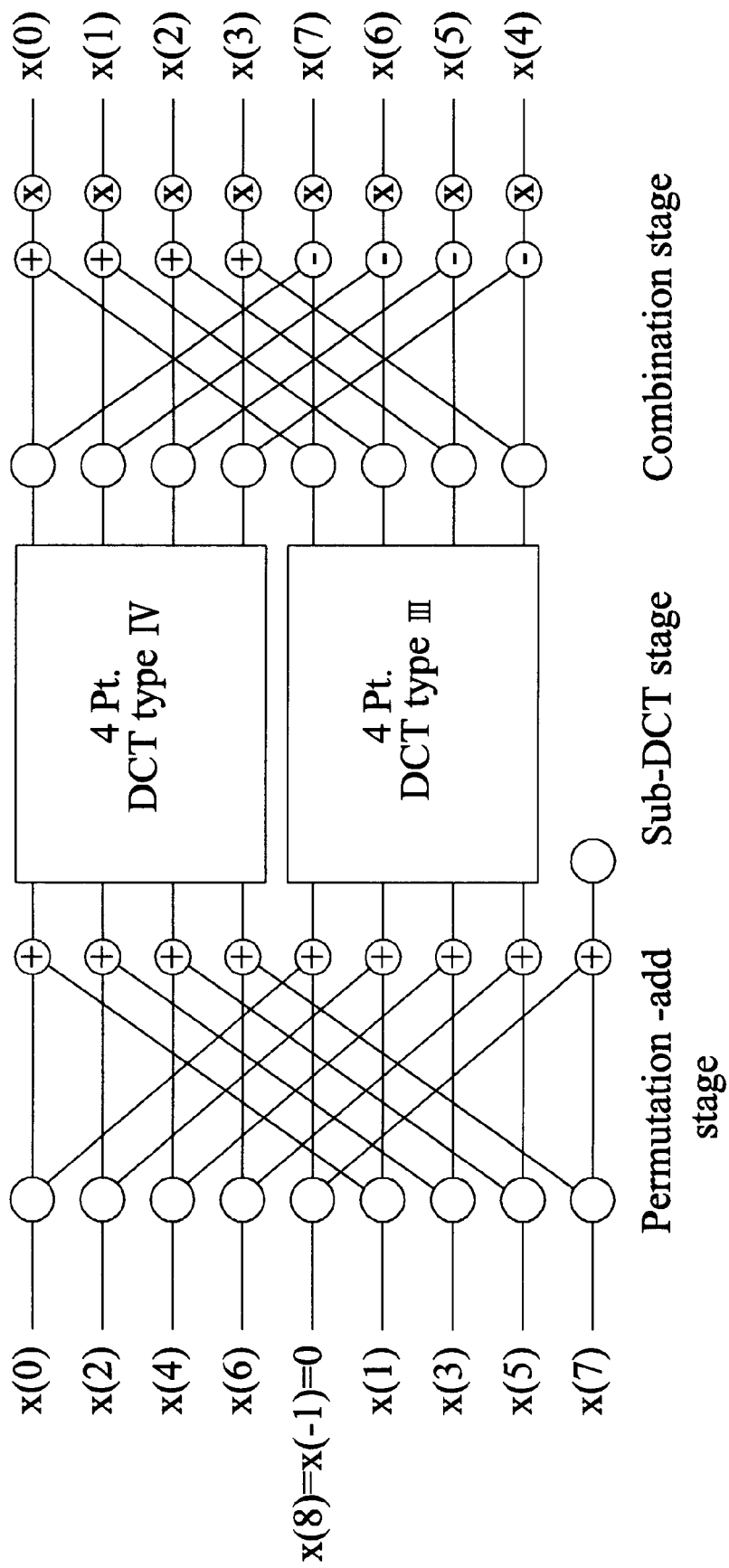
FIG. 6 illustrates the decomposition of one 8-point type-IV DCT into one 4-point type-III DCT and one 4-point type-IV DCT according to the present invention.

On the result of (43), a type-IV DCT with length N is decomposed into one type-IV DCT and one type-III DCT with length (N/2). FIG. 6 illustrates an embodiment of the decomposition of one 8-point type-IV DCT into one 4-point type-III DCT and one 4-point type-IV DCT according to the present invention.

3. Complexity Analysis

From FIGS. 4–6, the arithmetic complexities for all three types of the DCT are

DCT-II(N)=A(N)+DCT-IV(N/2)+DCT-II(N/2),

DCT-III(N)=A(N)+DCT-IV(N/2)+DCT-III(N/2), and

DCT-IV(N)=A(N−1)+M(N)+DCT-IV(N/2)+DCT-III(N/2), where DCT-II(N), DCT-III(N), and DCT-IV(N) are individually the arithmetic complexity of the type-II, type-III, and type-IV DCT with length N; and A($\mu$) and M($\kappa$) indicate the number of real additions and multiplications are $\mu$ and $\kappa$, respectively.

In addition, FIG. 7 illustrates the arithmetic complexity of the approach according to the present invention and the existing approaches for the radix-2 DCTs. As depicted in FIG. 7, the results illustrate that the present invention has a complexity matching with the well-known approaches.

The decomposition method of the present invention through the interleaving of the three types of DCT instead of the same type of DCTs has the regularity and the modularity in addition to the low complexity.

Furthermore, because the decomposition is the interleaving of the three types of the DCTs, the present invention is applicable to all the modified cosine transforms in the audio coding standards.

4. Conclusion

Variant forms of the modified cosine transforms (MCTs) have been widely used in different audio standards. The present invention has illustrated that all these MCTs can be led into two modules: a permutation and a discrete cosine transform. Specifically, the MCTs in encoders are accomplished as an input permutation and a DCT while the MCTs in decoder a DCT and a post permutation. The employed DCTs are either type-II, type-III, or type IV.

The present invention has provided a new fast architecture for the above three types of the discrete cosine transform. The new approach has been developed with decomposition from one type of the DCT into type-II, type-III, or type-IV. The decomposition has features in decomposing one type of DCT into type-II, type-III, or type-IV. The decomposition has been shown to have good features in regularity, complexity, and general applicability in all MCTs in audio coding standards.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A computation module for transforming audio data from time domain to transform domain for audio data compression, said computation module computing an M point discrete cosine transform of M input data points of said audio data, comprising:

a permutation-add stage for permuting said input data points and generating a first group of M/2 permuted data points and a second group of M/2 permuted data points;

a sub-transform stage for computing a first M/2 point discrete cosine transform of said first group of M/2 permuted data points and a second M/2 point discrete cosine transform of said second group of M/2 permuted data points for generating a first group of M/2 transformed data points and a second group of M/2 transformed data points; and a combination stage for combining said first and second groups of transformed data points as M transformed data points of the M point discrete cosine transform.

2. The computation module according to claim 1, wherein said permutation-add stage or said combination stage is a pass-through stage for passing data through without permutation or computation.

3. The computation module according to claim 1, said M point discrete cosine transform and said first and second M/2 point discrete cosine transforms being selected from the group of type-II, type-III and type-IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point, $X_k$ represents a transformed data point and N is the number of input data points in each discrete cosine transform.

4. The computation module according to claim 3, wherein said M point discrete transform is a type-II discrete cosine transform, said first M/2 point discrete transform is a type-II discrete cosine transform, and said second M/2 point discrete cosine transform is an M/2 point type-IV discrete cosine transform.

5. The computation module according to claim 3, wherein said M point discrete transform is a type-III discrete cosine transform, said first M/2 point discrete transform is a type-III discrete cosine transform, and said second M/2 point discrete cosine transform is an M/2 point type-IV discrete cosine transform.

6. The computation module according to claim 3, wherein said M point discrete transform is a type-IV discrete cosine transform, said first M/2 point discrete transform is a type-III discrete cosine transform, and said second M/2 point discrete cosine transform is an M/2 point type-IV discrete cosine transform.

7. A unified architecture for implementing a cosine modulated filter bank having a modified cosine transform for transforming audio data from time domain to transform domain for audio data compression, comprising:

a pre-permutation module; and a transform computing module for computing a discrete cosine transform;

wherein said modified cosine transform is decomposed into a pre-permutation executed by said pre-permutation module and a discrete cosine transform computed by said transform computing module, said discrete cosine transform being one selected from the group of type-II, type-III and type IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point of said audio data, $X_k$ represents a transformed data point and N is the number of input data points in each discrete cosine transform.

8. The unified architecture according to claim 7, wherein said cosine modulated filter bank is a time-domain aliasing cancellation filter bank, said modified cosine transform is decomposed into a pre-permutation and a type-IV discrete cosine transform.

9. The unified architecture according to claim 7, wherein said cosine modulated filter bank is a variant of a time-domain aliasing cancellation filter bank, said modified cosine transform is decomposed into a pre-permutation and a type-IV discrete cosine transform.

10. The unified architecture according to claim 7, wherein said cosine modulated filter bank is a polyphase filter bank, said modified cosine transform is decomposed into a pre-permutation and a type-III discrete cosine transform.

11. The unified architecture according to claim 7, said transform computing module further including a computation module for computing an M point discrete cosine transform of M input data points, said computation module comprising:

a permutation-add stage for permuting said input data points and generating a first group of M/2 permuted data points and a second group of M/2 permuted data points;

a sub-transform stage for computing a first M/2 point discrete cosine transform of said first group of M/2 permuted data points and a second M/2 point discrete cosine transform of said second group of M/2 permuted data points for generating a first group of M/2 transformed data points and a second group of M/2 transformed data points;

and a combination stage for combining said first and second groups of transformed data points as M transformed data points of the M point discrete cosine transform.

12. The unified architecture according to claim 11, wherein said permutation-add stage or said combination stage is a pass-through stage for passing data through without permutation or computation.

13. A unified architecture for implementing a cosine modulated filter bank having an inverse modified cosine transform for inversely transforming audio data from transform domain to time domain for audio data compression, comprising:

a transform computing module for computing a discrete cosine transform; and a post-permutation module;

wherein said inverse modified cosine transform is decomposed into a discrete cosine transform computed by said transform computing module and a post-permutation executed by said post-permutation module, said discrete cosine transform being one selected from the group of type-II, type-III and type IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point of said audio data, $X_k$ represents a transformed data point and N is the number of input data points in each discrete cosine transform.

14. The unified architecture according to claim 13, wherein said cosine modulated filter bank is a time-domain aliasing cancellation filter bank, said inverse modified cosine transform is decomposed into a type-IV discrete cosine transform and a post-permutation.

15. The unified architecture according to claim 13, wherein said cosine modulated filter bank is a variant of a time-domain aliasing cancellation filter bank, said inverse modified cosine transform is decomposed into a type-IV discrete cosine transform and a post-permutation.

16. The unified architecture according to claim 13, wherein said cosine modulated filter bank is a polyphase filter bank, said inverse modified cosine transform is decomposed into a type-III discrete cosine transform and a post permutation.

17. The unified architecture according to claim 13, said transform computing module further including a computation module for computing an M point discrete cosine transform of M input data points, said computation module comprising:

a permutation-add stage for permuting said input data points and generating a first group of M/2 permuted data points and a second group of M/2 permuted data points;

a sub-transform stage for computing a first M/2 point discrete cosine transform of said first group of M/2 permuted data points and a second M/2 point discrete cosine transform of said second group of M/2 permuted data points for generating a first group of M/2 transformed data points and a second group of M/2 transformed data points;

and a combination stage for combining said first and second groups of transformed data points as M transformed data points of the M point discrete cosine transform.

18. The unified architecture according to claim 17, wherein said permutation-add stage or said combination stage is a pass-through stage for passing data through without permutation or computation.

19. A method for computing a modified cosine transform for transforming audio data from time domain to transform domain for audio data compression, comprising the steps of:

decomposing said modified cosine transform into a pre-permutation and a discrete cosine transform selected from the group of type-II, type-III and type IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point of said audio data, $X_k$ represents a transformed data point and N is the number of input data points in each discrete cosine transform;

performing the pre-permutation; and computing the decomposed discrete cosine transform.

20. A method for computing an inverse modified cosine transform for inversely transforming audio data from transform domain to time domain for audio data compression, comprising the steps of:

decomposing said inverse modified cosine transform into a post-permutation and a discrete cosine transform selected from the group of type-II, type-III and type IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point of said audio data, $X_k$ represents a transformed data point and N is the number of input data points in each discrete cosine transform;

computing the decomposed discrete cosine transform; and performing the post-permutation.

21. A method of computing an M point discrete cosine transform of M input data points of audio data for transforming said audio data from time domain to transform domain for audio data compression, comprising the steps of:

permuting said M input data points and generating a first group of M/2 permuted data points and a second group of M/2 permuted data points;

computing a first M/2 point discrete cosine transform of said first group of M/2 permuted data points and a second M/2 point discrete cosine transform of said second group of M/2 permuted data points for generating a first group of M/2 transformed data points and a second group of M/2 transformed data points;

and combining said first and second groups of transformed data points as M transformed data points of said M point discrete cosine transform.

22. The method of computing an M point discrete cosine transform of M input data points according to claim 21, said M point discrete cosine transform and said first and second M/2 point discrete cosine transforms being selected from the group of type-II, type-III and type-IV discrete cosine transforms, said type-II discrete cosine transform being expressed by $$X_k = \sum_{i=0}^{N-1} x_i \cos\left(\frac{\pi}{2N}(2i+1)(k)\right) \text{ for } k = 0, 1, \ldots, N-1,$$

said type-III discrete cosine transform being expressed by $$X_k = \sum_{i=0}^{N-1} x_i \cos\left(\frac{\pi}{2N}(i)(2k+1)\right) \text{ for } k = 0, 1, \ldots, N-1,$$

and said type-IV discrete cosine transform being expressed by $$X_k = \sum_{i=0}^{N-1} x_i \cos\left(\frac{\pi}{4N}(2i+1)(2k+1)\right) \text{ for } k = 0, 1, \ldots, N-1;$$

wherein $x_i$ represents an input data point, $X_k$ represents a transformed data point and N is the number of input data points in each discrete cosine transform.

* * * * *